US012779708B2

(12) United States Patent
Kim et al.

(10) Patent No.: US 12,779,708 B2
(45) Date of Patent: Nov. 3, 2026

(54) ROBOT

(71) Applicant: LG ELECTRONICS INC., Seoul (KR)

(72) Inventors: Youngeun Kim, Seoul (KR); Jaecheon Sa, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 266 days.

(21) Appl. No.: 18/706,297

(22) PCT Filed: Nov. 22, 2021

(86) PCT No.: PCT/KR2021/017175
§ 371 (c)(1),
(2) Date: Apr. 30, 2024

(87) PCT Pub. No.: WO2023/090497
PCT Pub. Date: May 25, 2023

(65) Prior Publication Data

US 2026/0124771 A1 May 7, 2026

(30) Foreign Application Priority Data

Nov. 17, 2021 (KR) ........................ 10-2021-0158905

(51) Int. Cl.
*B25J 18/00* (2006.01)
*B25J 9/10* (2006.01)
*B25J 9/12* (2006.01)
*B25J 19/00* (2006.01)

(52) U.S. Cl.
CPC ............. *B25J 18/002* (2013.01); *B25J 9/106* (2013.01); *B25J 9/126* (2013.01); *B25J 19/0016* (2013.01)

(58) Field of Classification Search
CPC ...... B25J 17/0241; B25J 18/002; B25J 9/106; B25J 9/126
See application file for complete search history.

(56) References Cited

U.S. PATENT DOCUMENTS

| | | | |
|---|---|---|---|
| 9,535,421 B1 | 1/2017 | Canoso et al. | |
| 2022/0258818 A1* | 8/2022 | Yang | B25J 5/00 |

FOREIGN PATENT DOCUMENTS

| | | | |
|---|---|---|---|
| JP | 2005-170545 | 6/2005 | |
| JP | 2005170545 A * | 6/2005 | B65F 1/1638 |
| KR | 10-2003-0041122 | 5/2003 | |

(Continued)

OTHER PUBLICATIONS

PCT International Application No. PCT/KR2021/017175, International Search Report dated Aug. 8, 2022, 4 pages.

*Primary Examiner* — Gregory Robert Weber
(74) *Attorney, Agent, or Firm* — LEE, HONG, DEGERMAN, KANG & WAIMEY

(57) ABSTRACT

A robot according to the present embodiment comprises: a body including an accommodation body in which an accommodation space is formed; a door connected to the body by means of a hinge, and rotated around the first hinge so as to open/close the accommodation space; a driving source provided in the body; a power transmission member for transmitting the rotation power of the driving force between the driving source and the door; and a spring, which has one side connected to the body and has the other side connected to the door so as to compensate for the gravity of the door.

8 Claims, 10 Drawing Sheets

(56) References Cited

FOREIGN PATENT DOCUMENTS

| | | | | | |
|---|---|---|---|---|---|
| KR | 10-0771101 | | | 11/2007 | |
| KR | 10-2017-0054374 | | | 5/2017 | |
| KR | 20170054374 | A | * | 5/2017 | ............ B65F 1/1638 |
| KR | 10-2018-0080499 | | | 7/2018 | |
| KR | 10-2021-0064015 | | | 6/2021 | |

* cited by examiner

【FIG. 1】
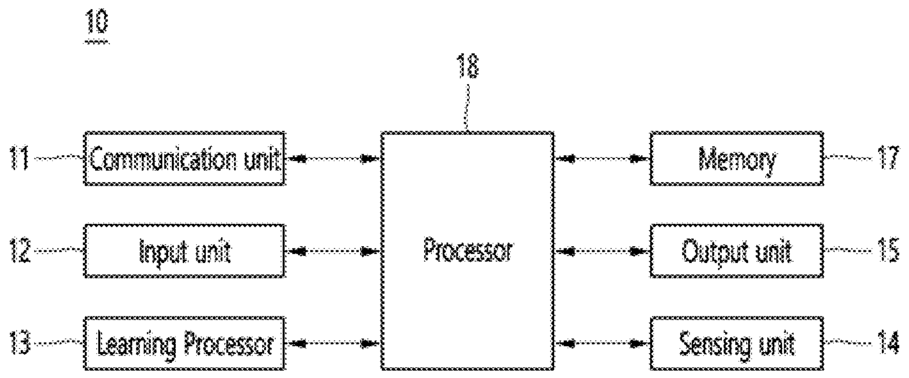
【FIG. 2】
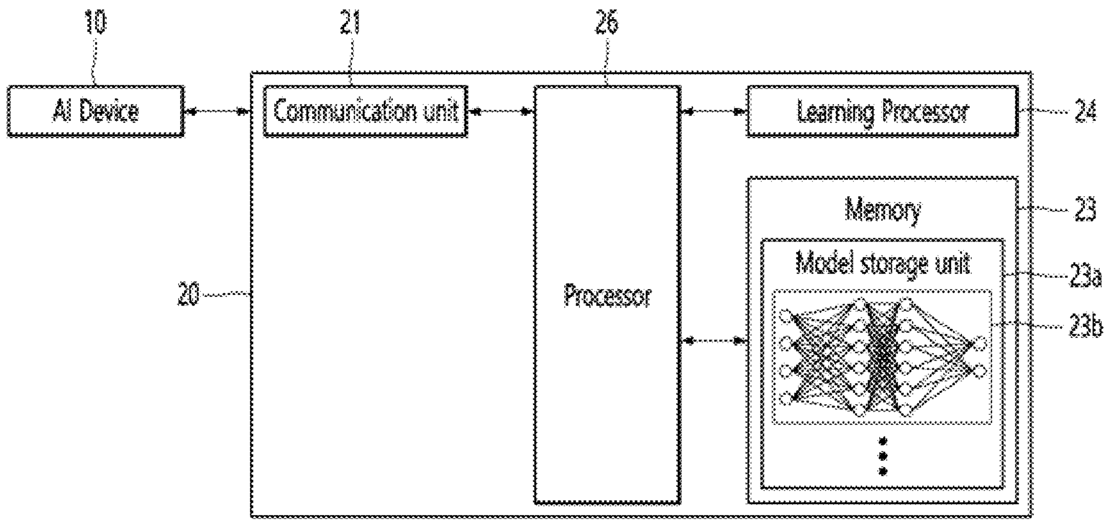

【FIG. 3】
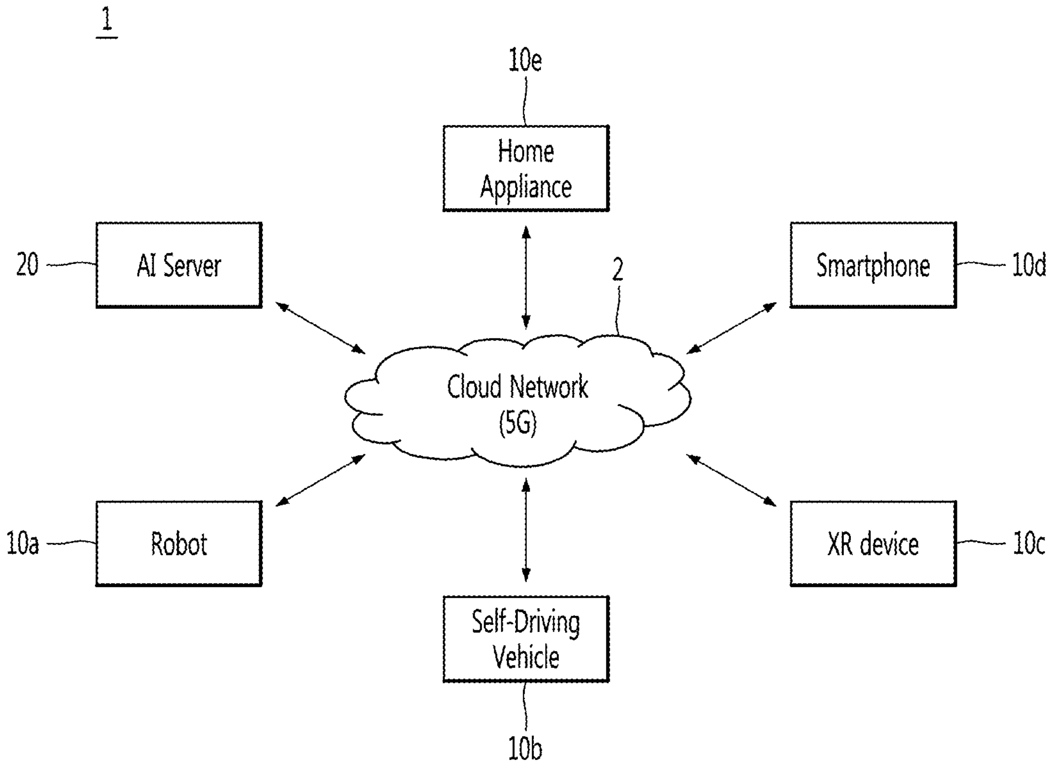

【FIG. 4】
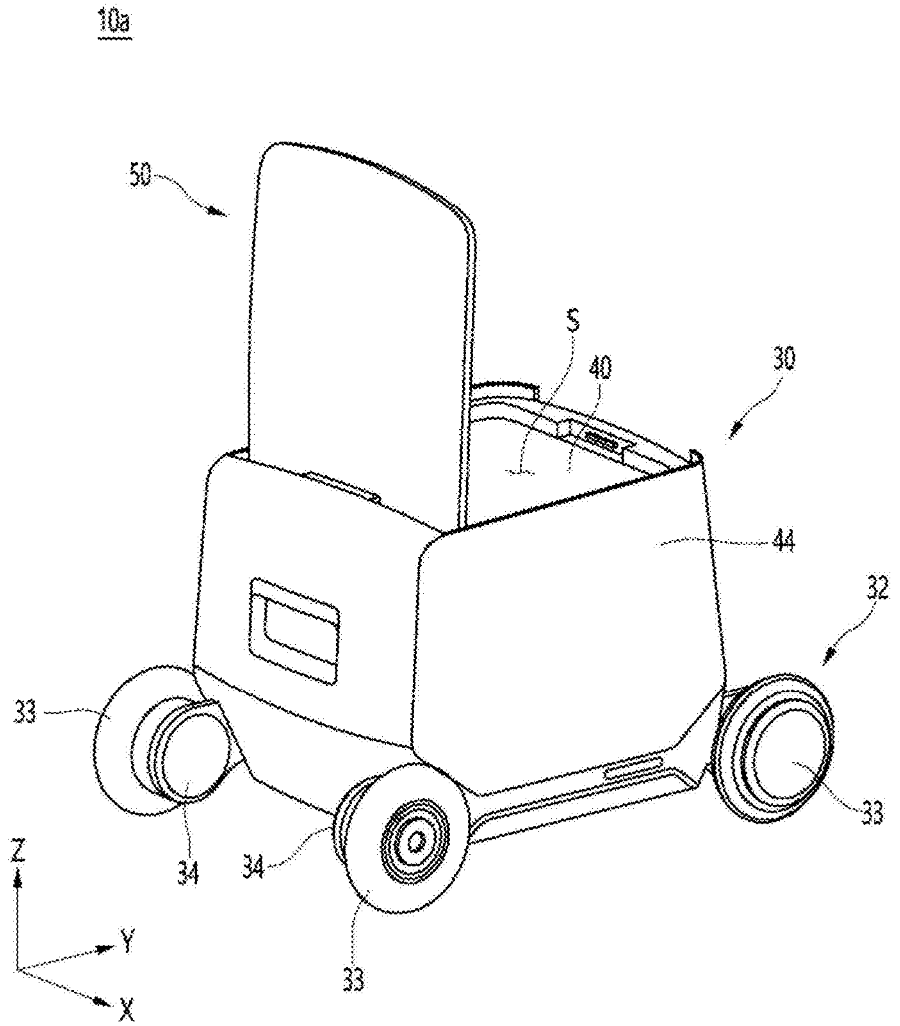

【FIG. 5】
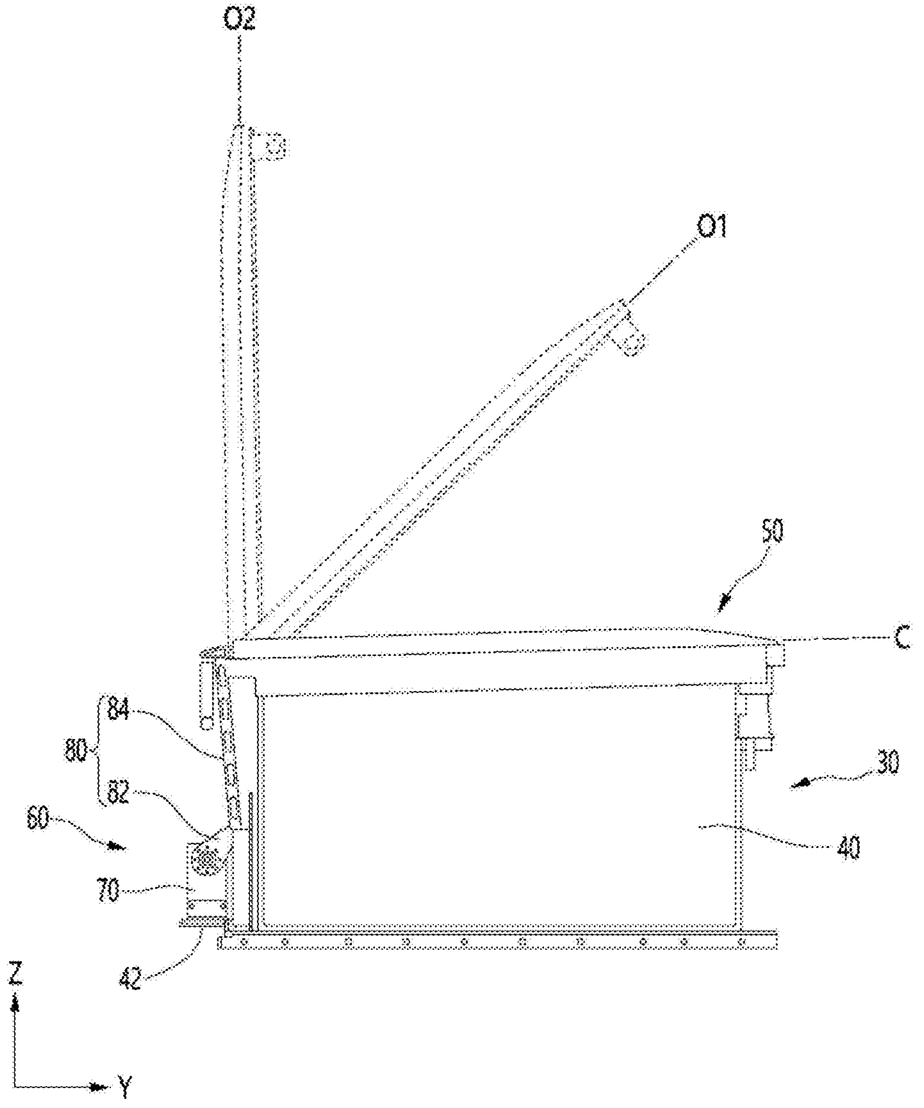

【FIG. 6】
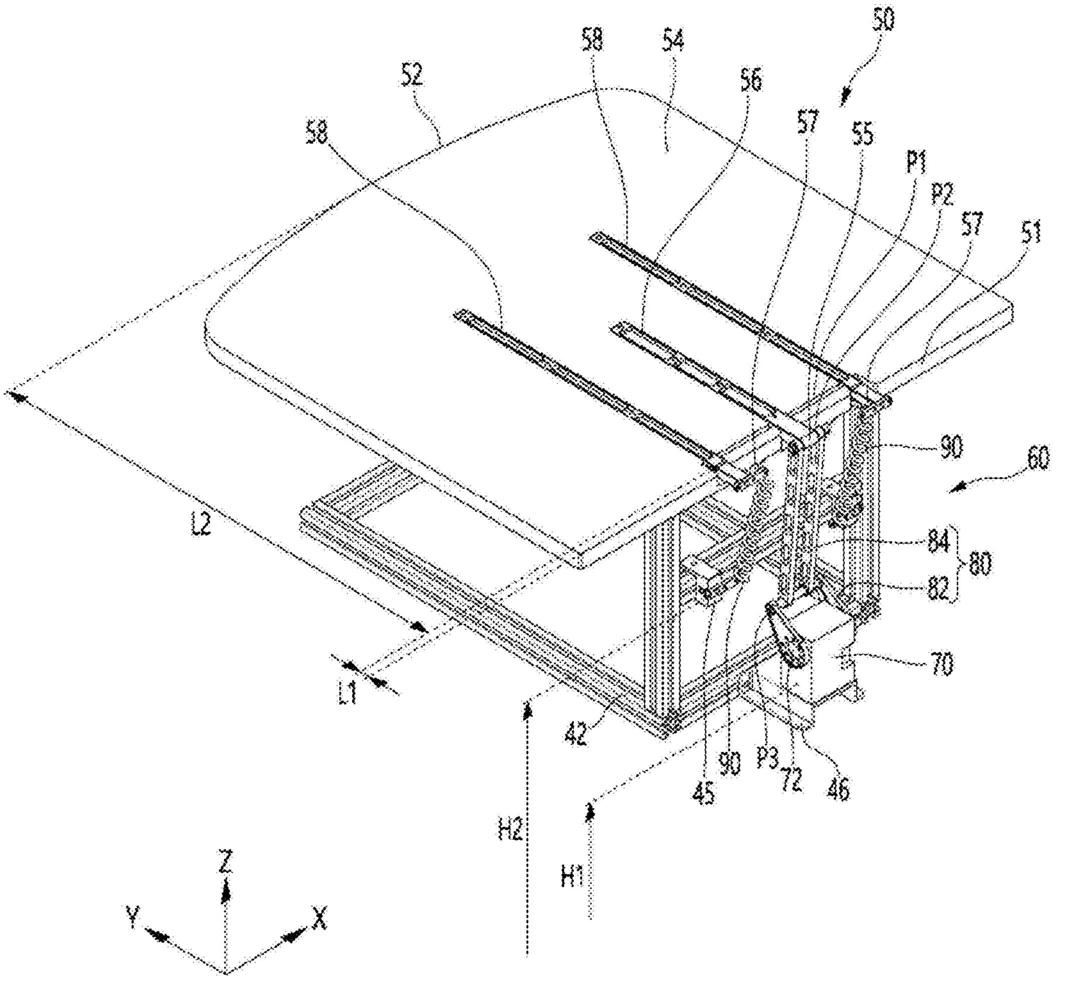

【FIG. 7】
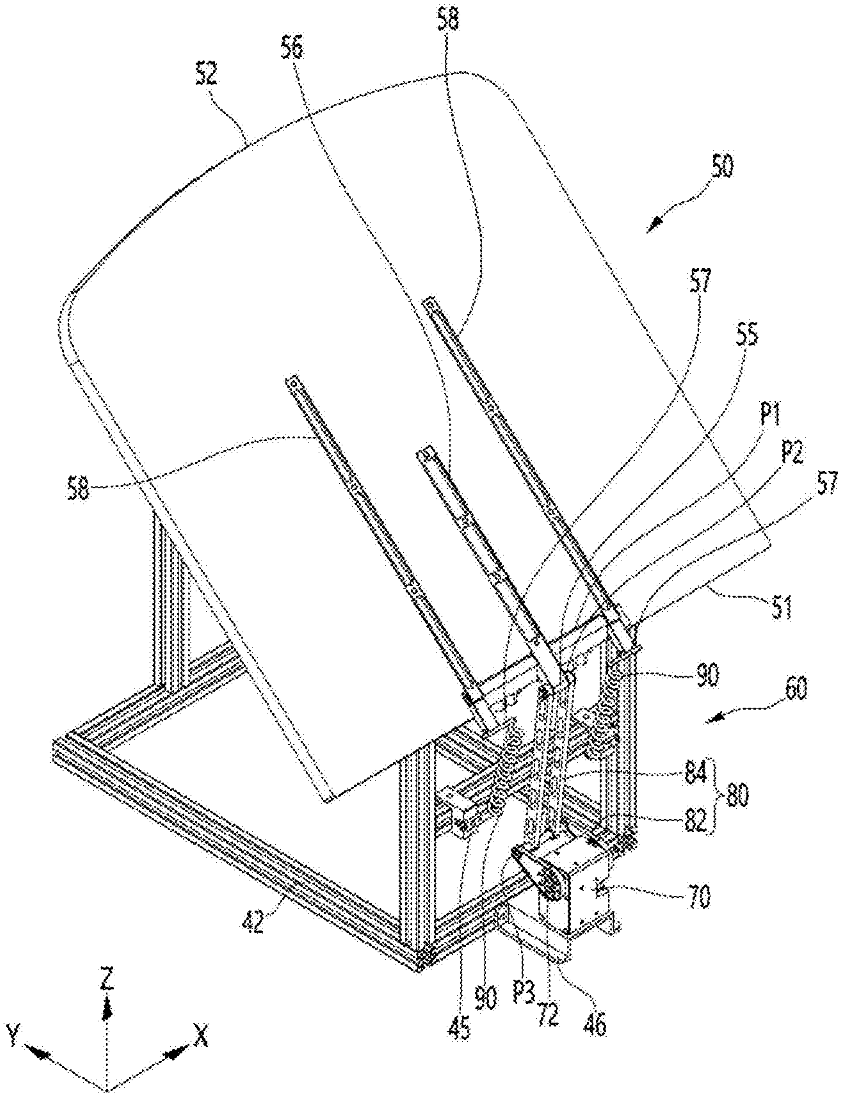

【FIG. 8】
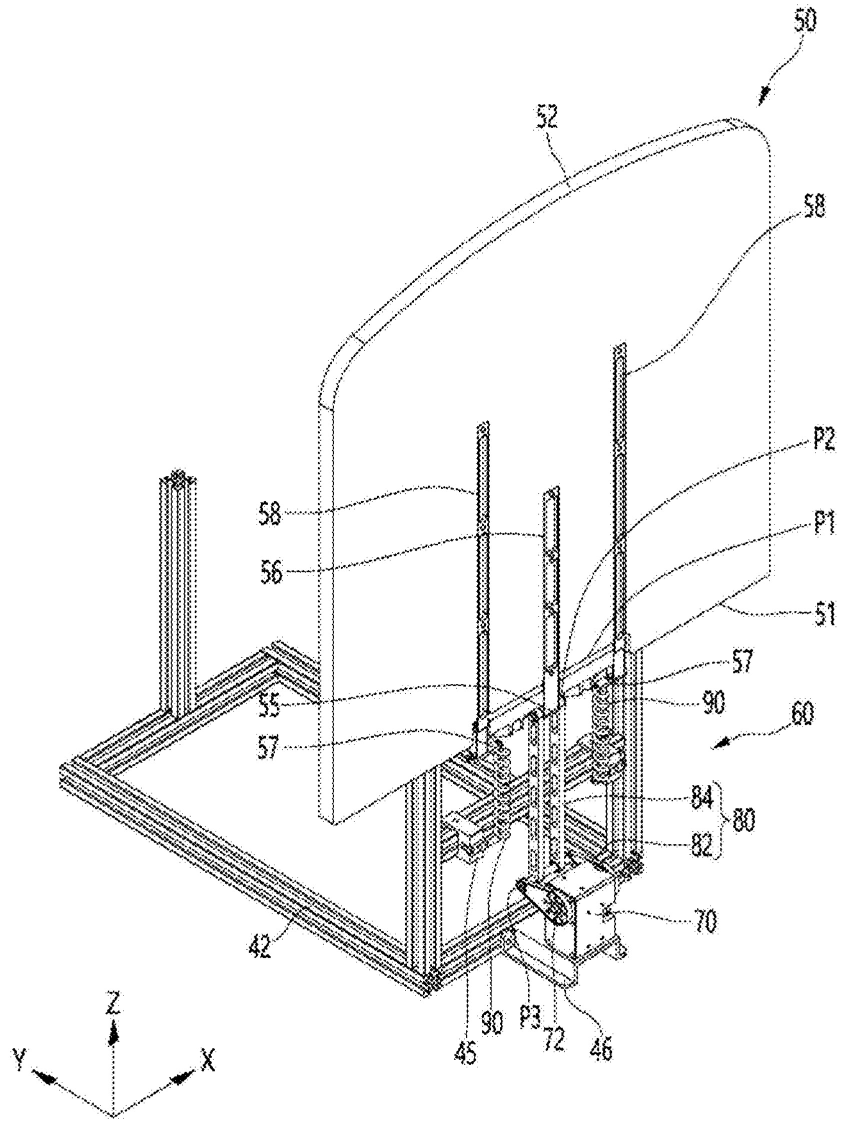

【FIG. 9】
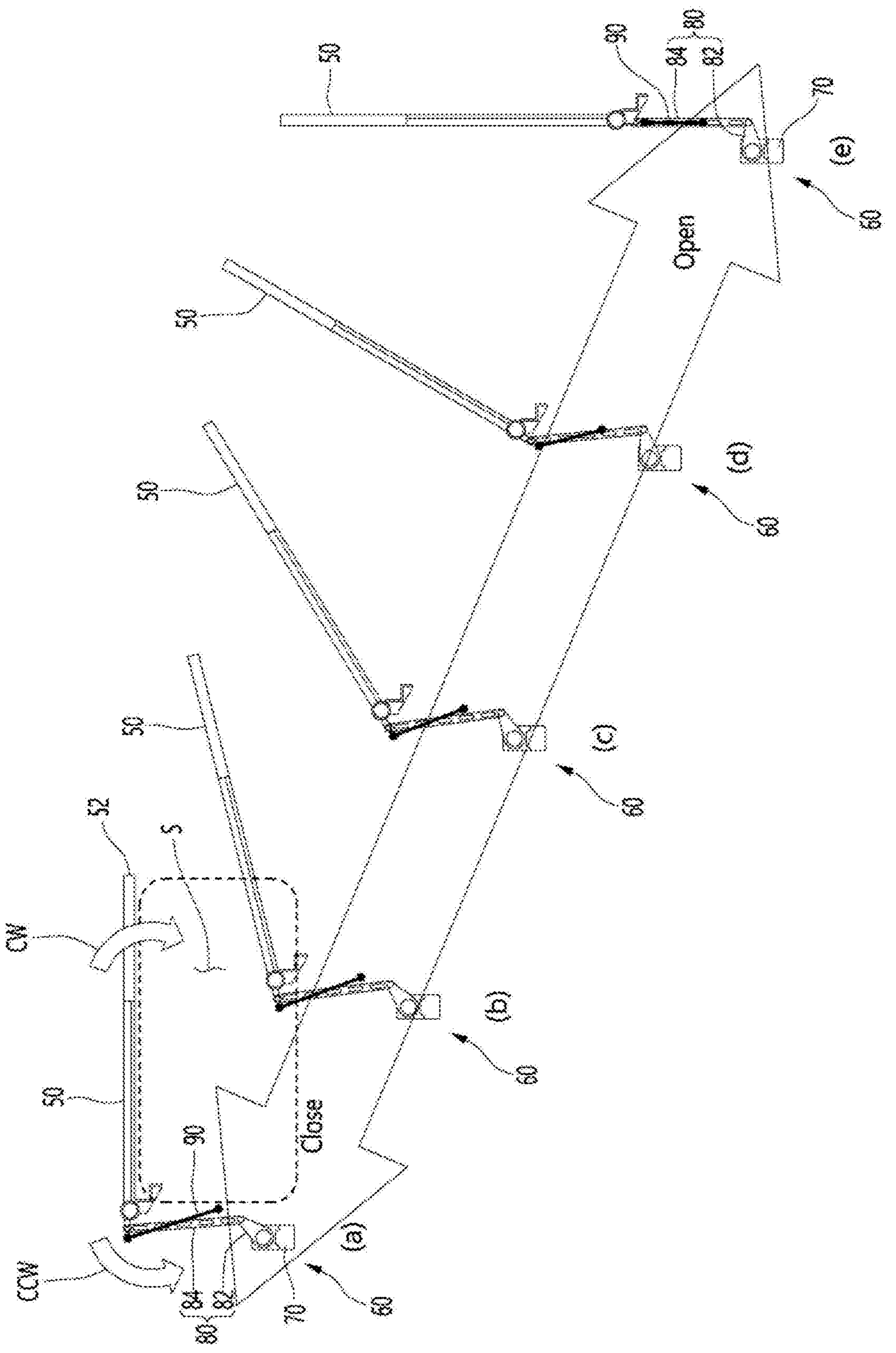

【FIG. 10】
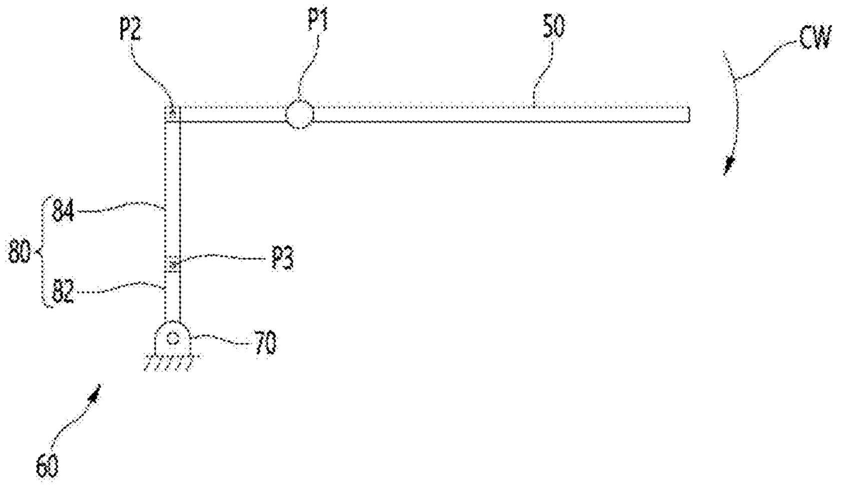
【FIG. 11】
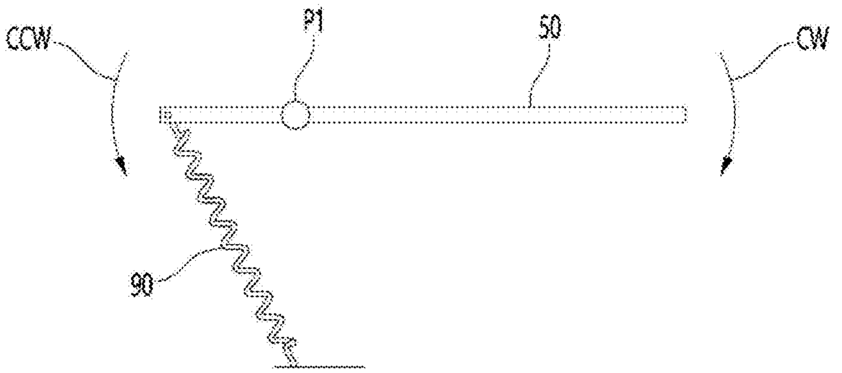

【 FIG. 12】
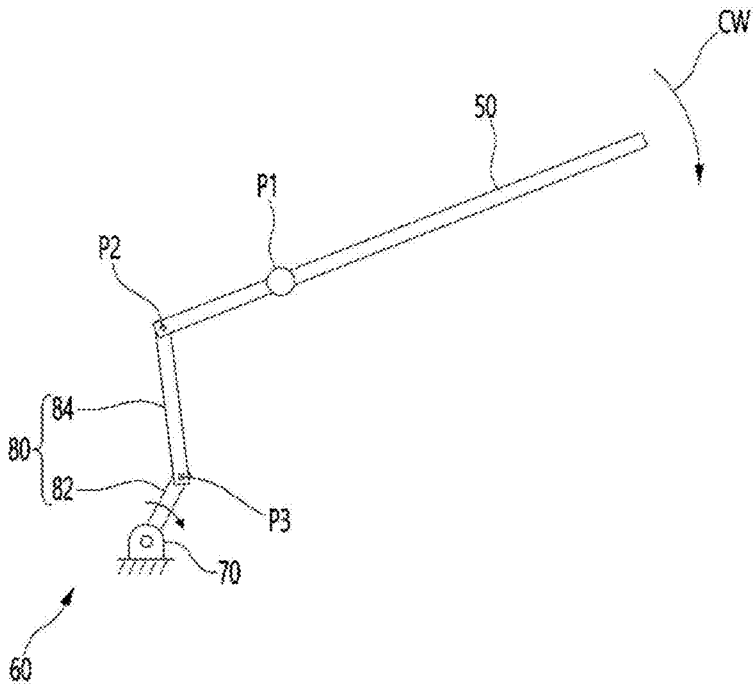
【 FIG. 13】
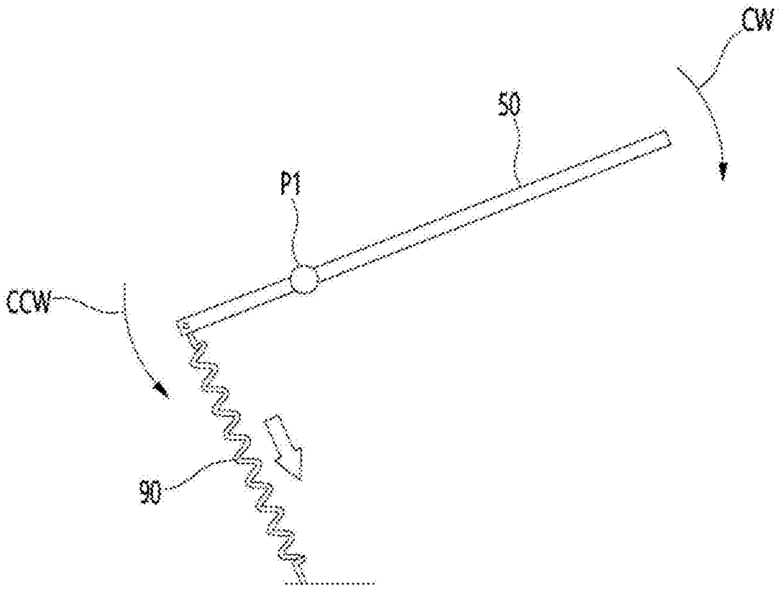

ROBOT

CROSS-REFERENCE TO RELATED APPLICATION(S)

This application is the National Stage filing under 35 U.S.C. 371 of International Application No. PCT/KR2021/017175, filed on Nov. 22, 2021, which claims the benefit of earlier filing date and right of priority to Korean Application No. 10-2021-0158905, filed on Nov. 17, 2021, the contents of which are all hereby incorporated by reference herein in their entireties.

TECHNICAL FIELD

The present disclosure relates to a robot.

BACKGROUND ART

A robot is a machine that automatically processes or operates a given task by own capabilities thereof, and the application fields of robots can be generally classified into industrial, medical, space, subsea use, and the like and can be used in various fields.

Among robots, a delivery robot may comprise a storage body with a storage space formed inside, and a door that opens and closes the storage space, and the user can rotate the door upward to open the storage space, place items in the storage space, or take out items stored in the storage space.

DISCLOSURE

Technical Problem

An object of this embodiment is to provide a robot that can minimize the load on the driving source for opening the door.

Technical Solution

A robot according to the present embodiment comprises a body comprising a storage body with a storage space formed therein; a door connected to the body with a first hinge and configured to rotate about the first hinge to open and close the storage space; a driving source installed on the body; a power transmission member configured to transmit the rotational force of the driving source between the driving source and the door; and a spring having a side connected to the body and the other side connected to the door to compensate for the gravity of the door.

The body may be disposed outside the storage body and comprise a driving source bracket on which the driving source is mounted.

The power transmission member may comprise a lever connected to the rotation shaft of the driving source; and a driving link connected to the door with a second hinge, connected to the lever with a third hinge, and disposed outside the storage body.

The length of the spring may be shorter than the length of the driving link.

A pair of springs may be provided, and the driving link may be disposed between a pair of springs.

The door may comprise one end portion spaced apart from the first hinge by a first distance, and the other end portion spaced apart from the first hinge by a second distance greater than the first distance.

The driving source may be closer to the one end portion of the one end portion and the other end portion.

The door may comprise a driving link connection portion where the driving link is rotatably connected to a second hinge, and an upper connection portion to which the upper portion of the spring is connected and spaced apart from the driving link connection portion.

The body may comprise a lower connection portion to which the lower portion of the spring is connected. A height of a lower connection portion may be higher than a height of the driving source.

The door may comprise a door body; a driving link bracket installed on the door body and to which the driving link is connected, and a spring bracket installed on the door body to be spaced apart from the driving link bracket and to which the spring is connected.

The spring may be tensioned to the maximum when the door is closed and may be tensioned to the minimum when the door is opened.

Advantageous Effect

According to an embodiment of the present disclosure, the spring compensates for the gravity of the door, thereby minimizing the driving force of the driving source and power consumption.

In addition, the driving source, power transmission member, and spring do not encroach on the storage space, so the storage space can be maximized.

BRIEF DESCRIPTION OF DRAWINGS

FIG. 1 illustrates an artificial intelligence (AI) device comprising a robot according to an embodiment of the present disclosure.

FIG. 2 illustrates an AI server connected to a robot according to an embodiment of the present disclosure.

FIG. 3 illustrates an AI system according to an embodiment of the present disclosure.

FIG. 4 is a perspective view illustrating a robot according to the present embodiment.

FIG. 5 is a side view illustrating the storage body and door of the robot according to the present embodiment.

FIG. 6 is a perspective view illustrating a state where the door according to the present embodiment is closed.

FIG. 7 is a perspective view illustrating a state where the door according to the present embodiment is partially open.

FIG. 8 is a perspective view illustrating a state where the door according to the present embodiment is fully open.

FIG. 9 is a diagram illustrating a process in which a door according to the present embodiment is rotated from a state of being closed to a state of being fully open.

FIG. 10 is a conceptual diagram illustrating a driving source, a power transmission member, and a door when the door according to the present embodiment is closed.

FIG. 11 is a conceptual diagram illustrating a spring and a door when the door according to the present embodiment is closed.

FIG. 12 is a conceptual diagram illustrating a driving source, a power transmission member, and a door when the door according to the present embodiment is open.

FIG. 13 is a conceptual diagram illustrating a spring and a door when the door according to the present embodiment is open.

EMBODIMENTS OF THE DISCLOSURE

Hereinafter, detailed embodiments will be described in detail with reference to the accompanying drawings.

Hereinafter, when an element is described as being "coupled" or "connected" to another element, it means that the two elements are directly coupled or connected, or a third element exists between the two elements, and the two elements are coupled or connected to each other by the third element. On the other hand, the "direct coupling" or "direct connecting" of one element to the other element may be understood that the third element does not exist between the two elements.

Robot

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot comprises a driving unit may comprise an actuator or a motor and may perform various physical operations such as moving a robot joint. In addition, a movable robot may comprise a wheel, a brake, a propeller, and the like in a driving unit, and may travel on the ground through the driving unit or fly in the air.

Artificial Intelligence (AI)

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may comprise an input layer, an output layer, and optionally one or more hidden layers. Each layer comprises one or more neurons, and the artificial neural network may comprise a synapse that links neurons to neurons. In the artificial neural network, each neuron may output the function value of the activation function for input signals, weights, and deflections input through the synapse.

Model parameters refer to parameters determined through learning and comprise a weight value of synaptic connection and deflection of neurons. A hyperparameter means a parameter to be set in the machine learning algorithm before learning, and comprises a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) comprising a plurality of hidden layers among artificial neural networks, is also referred to as deep learning, and the deep learning is part of machine learning. In the following, machine learning is used to mean deep learning.

Self-Driving

Self-driving refers to a technique of driving for oneself, and a self-driving vehicle refers to a vehicle that travels without an operation of a user or with a minimum operation of a user.

For example, the self-driving may comprise a technology for maintaining a lane while driving, a technology for automatically adjusting a speed, such as adaptive cruise control, a technique for automatically traveling along a predetermined route, and a technology for automatically setting and traveling a route when a destination is set.

The vehicle may comprise a vehicle having only an internal combustion engine, a hybrid vehicle having an internal combustion engine and an electric motor together, and an electric vehicle having only an electric motor, and may comprise not only an automobile but also a train, a motorcycle, and the like.

At this time, the self-driving vehicle may be regarded as a robot having a self-driving function.

FIG. 1 illustrates an AI device 10 comprising a robot according to an embodiment of the present disclosure.

The AI device 10 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 10 may comprise a communication interface 11, an input unit 12, a learning processor 13, a sensing unit 14, an output unit 15, a memory 17, and a processor 18.

The communication interface 11 may transmit and receive data to and from external devices such as other AI devices 10*a* to 10*e* and the AI server 20 by using wire/wireless communication technology. For example, the communication interface 11 may transmit and receive sensor information, a user input, a learning model, and a control signal to and from external devices.

The communication technology used by the communication interface 11 comprises GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 12 may acquire various kinds of data.

At this time, the input unit 12 may comprise a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input unit 12 may acquire a learning data for model learning and an input data to be used when an output is acquired by using learning model. The input unit 12 may acquire raw input data. In this case, the processor 18 or the learning processor 13 may extract an input feature by preprocessing the input data.

The learning processor 13 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 13 may perform AI processing together with the learning processor 24 of the AI server 20.

At this time, the learning processor 13 may comprise a memory integrated or implemented in the AI device 10. Alternatively, the learning processor 13 may be implemented by using the memory 17, an external memory directly connected to the AI device 10, or a memory held in an external device.

The sensing unit 14 may acquire at least one of internal information about the AI device 10, ambient environment information about the AI device 10, and user information by using various sensors.

Examples of the sensors comprised in the sensing unit 14 may comprise a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 15 may generate an output related to a visual sense, an auditory sense, or a haptic sense.

At this time, the output unit 15 may comprise a display unit for outputting time information, a speaker for outputting auditory information, and a haptic module for outputting haptic information.

The memory 17 may store data that supports various functions of the AI device 10. For example, the memory 17 may store input data acquired by the input unit 12, learning data, a learning model, a learning history, and the like.

The processor 18 may determine at least one executable operation of the AI device 10 based on information determined or generated by using a data analysis algorithm or a machine learning algorithm. The processor 18 may control the components of the AI device 10 to execute the determined operation.

To this end, the processor 18 may request, search, receive, or utilize data of the learning processor 13 or the memory 17. The processor 18 may control the components of the AI device 10 to execute the predicted operation or the operation determined to be desirable among the at least one executable operation.

When the connection of an external device is required to perform the determined operation, the processor 18 may generate a control signal for controlling the external device and may transmit the generated control signal to the external device.

The processor 18 may acquire intention information for the user input and may determine the user's requirements based on the acquired intention information.

The processor 18 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 13, may be learned by the learning processor 24 of the AI server 20, or may be learned by their distributed processing.

The processor 18 may collect history information comprising the operation contents of the AI apparatus 100 or the user's feedback on the operation and may store the collected history information in the memory 17 or the learning processor 13 or transmit the collected history information to the external device such as the AI server 20. The collected history information may be used to update the learning model.

The processor 18 may control at least part of the components of AI device 10 so as to drive an application program stored in memory 17. Furthermore, the processor 18 may operate two or more of the components comprised in the AI device 10 in combination so as to drive the application program.

FIG. 2 illustrates an AI server 20 connected to a robot according to an embodiment of the present disclosure.

Referring to FIG. 2, the AI server 20 may refer to a device that learns an artificial neural network by using a machine learning algorithm or uses a learned artificial neural network. The AI server 20 may comprise a plurality of servers to perform distributed processing, or may be defined as a 5G network. At this time, the AI server 20 may be comprised as a partial configuration of the AI device 10, and may perform at least part of the AI processing together.

The AI server 20 may comprise a communication interface 21, a memory 23, a learning processor 24, a processor 26, and the like.

The communication interface 21 can transmit and receive data to and from an external device such as the AI device 10.

The memory 23 may comprise a model storage unit 23*a*. The model storage unit 23*a* may store a learning or learned model (or an artificial neural network 26*b*) through the learning processor 24.

The learning processor 24 may learn the artificial neural network 26*b* by using the learning data. The learning model may be used in a state of being mounted on the AI server 20 of the artificial neural network, or may be used in a state of being mounted on an external device such as the AI device 10.

The learning model may be implemented in hardware, software, or a combination of hardware and software. If all or part of the learning models are implemented in software, one or more instructions that constitute the learning model may be stored in memory 23.

The processor 26 may infer the result value for new input data by using the learning model and may generate a response or a control command based on the inferred result value.

FIG. 3 illustrates an AI system 1 according to an embodiment of the present disclosure.

Referring to FIG. 3, in the AI system 1, at least one of an AI server 20, a robot 10*a*, a self-driving vehicle 10*b*, an XR device 10*c*, a smartphone 10*d*, or a home appliance 10*e* is connected to a cloud network 2. The robot 10*a*, the self-driving vehicle 10*b*, the XR device 10*c*, the smartphone 10*d*, or the home appliance 10*e*, to which the AI technology is applied, may be referred to as AI devices 10*a* to 10*e*.

The cloud network 2 may refer to a network that forms part of a cloud computing infrastructure or exists in a cloud computing infrastructure. The cloud network 2 may be configured by using a 3G network, a 4G or LTE network, or a 5G network.

That is, the devices 10*a* to 10*e* and 20 configuring the AI system 1 may be connected to each other through the cloud network 2. In particular, each of the devices 10*a* to 10*e* and 20 may communicate with each other through a base station, but may directly communicate with each other without using a base station.

The AI server 20 may comprise a server that performs AI processing and a server that performs operations on big data.

The AI server 20 may be connected to at least one of the AI devices constituting the AI system 1, that is, the robot 10*a*, the self-driving vehicle 10*b*, the XR device 10*c*, the smartphone 10*d*, or the home appliance 10*e* through the cloud network 2, and may assist at least part of AI processing of the connected AI devices 10*a* to 10*e*.

At this time, the AI server 20 may learn the artificial neural network according to the machine learning algorithm instead of the AI devices 10*a* to 10*e*, and may directly store the learning model or transmit the learning model to the AI devices 10*a* to 10*e*.

At this time, the AI server 20 may receive input data from the AI devices 10*a* to 10*e*, may infer the result value for the received input data by using the learning model, may generate a response or a control command based on the inferred result value, and may transmit the response or the control command to the AI devices 10*a* to 10*e*.

Alternatively, the AI devices 10*a* to 10*e* may infer the result value for the input data by directly using the learning model, and may generate the response or the control command based on the inference result.

Hereinafter, various embodiments of the AI devices 10*a* to 10*e* to which the above-described technology is applied will be described. The AI devices 10*a* to 10*e* illustrated in FIG. 3 may be regarded as a specific embodiment of the AI device 10 illustrated in FIG. 1.

AI+Robot

The robot 10*a*, to which the AI technology is applied, may be implemented as a guide robot, a carrying robot, a cleaning robot, a wearable robot, an entertainment robot, a pet robot, an unmanned flying robot, or the like.

The robot 10*a* may comprise a robot control module for controlling the operation, and the robot control module may refer to a software module or a chip implementing the software module by hardware.

The robot 10*a* may acquire state information about the robot 10*a* by using sensor information acquired from various kinds of sensors, may detect (recognize) surrounding environment and objects, may generate map data, may determine the route and the travel plan, may determine the response to user interaction, or may determine the operation.

The robot 10*a* may use the sensor information acquired from at least one sensor among the lidar, the radar, and the camera so as to determine the travel route and the travel plan.

The robot 10*a* may perform the above-described operations by using the learning model composed of at least one artificial neural network. For example, the robot 10*a* may recognize the surrounding environment and the objects by using the learning model, and may determine the operation by using the recognized surrounding information or object information. The learning model may be learned directly from the robot 10*a* or may be learned from an external device such as the AI server 20.

At this time, the robot 10*a* may perform the operation by generating the result by directly using the learning model, but the sensor information may be transmitted to the external device such as the AI server 20 and the generated result may be received to perform the operation.

The robot 10*a* may use at least one of the map data, the object information detected from the sensor information, or the object information acquired from the external apparatus to determine the travel route and the travel plan, and may control the driving unit such that the robot 10*a* travels along the determined travel route and travel plan.

The map data may comprise object identification information about various objects arranged in the space in which the robot 10*a* moves. For example, the map data may comprise object identification information about fixed objects such as walls and doors and movable objects such as pollen and desks. The object identification information may comprise a name, a type, a distance, and a position.

In addition, the robot 10*a* may perform the operation or travel by controlling the driving unit based on the control/interaction of the user. At this time, the robot 10*a* may acquire the intention information of the interaction due to the user's operation or speech utterance, and may determine the response based on the acquired intention information, and may perform the operation.

AI+Robot+Self-Driving

The robot 10*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 10*a*, to which the AI technology and the self-driving technology are applied, may refer to the robot itself having the self-driving function or the robot 10*a* interacting with the self-driving vehicle 10*b*.

The robot 10*a* having the self-driving function may collectively refer to a device that moves for itself along the given movement line without the user's control or moves for itself by determining the movement line by itself.

The robot 10*a* and the self-driving vehicle 10*b* having the self-driving function may use a common sensing method so as to determine at least one of the travel route or the travel plan. For example, the robot 10*a* and the self-driving vehicle 10*b* having the self-driving function may determine at least one of the travel route or the travel plan by using the information sensed through the lidar, the radar, and the camera.

The robot 10*a* that interacts with the self-driving vehicle 10*b* exists separately from the self-driving vehicle 10*b* and may perform operations interworking with the self-driving function of the self-driving vehicle 10*b* or interworking with the user who rides on the self-driving vehicle 10*b*.

At this time, the robot 10*a* interacting with the self-driving vehicle 10*b* may control or assist the self-driving function of the self-driving vehicle 10*b* by acquiring sensor information on behalf of the self-driving vehicle 10*b* and providing the sensor information to the self-driving vehicle 10*b*, or by acquiring sensor information, generating environment information or object information, and providing the information to the self-driving vehicle 10*b*.

Alternatively, the robot 10*a* interacting with the self-driving vehicle 10*b* may monitor the user boarding the self-driving vehicle 10*b*, or may control the function of the self-driving vehicle 10*b* through the interaction with the user. For example, when it is determined that the driver is in a drowsy state, the robot 10*a* may activate the self-driving function of the self-driving vehicle 10*b* or assist the control of the driving unit of the self-driving vehicle 10*b*. The function of the self-driving vehicle 10*b* controlled by the robot 10*a* may comprise not only the self-driving function but also the function provided by the navigation system or the audio system provided in the self-driving vehicle 10*b*.

Alternatively, the robot 10*a* that interacts with the self-driving vehicle 10*b* may provide information or assist the function to the self-driving vehicle 10*b* outside the self-driving vehicle 10*b*. For example, the robot 10*a* may provide traffic information comprising signal information and the like, such as a smart signal, to the self-driving vehicle 10*b*, and automatically connect an electric charger to a charging port by interacting with the self-driving vehicle 10*b* like an automatic electric charger of an electric vehicle.

FIG. 4 is a perspective view illustrating a robot according to the present embodiment, and FIG. 5 is a side view illustrating a body and door of the robot according to the present embodiment.

The robot 10*a* may comprise a body 30 and a driving module 32 mounted on the body 30.

The driving module 32 is capable of driving the robot 10*a* in the front and rear direction (Y, traveling direction), and may be provided at the lower portion of the body 30. The driving module 32 may comprise at least one wheel 33 and a motor 34 capable of rotating the wheel 33.

An example of the robot 10*a* may be a delivery robot capable of transporting various items such as food or packaging supplies, and the body 30 may comprise a storage body 40 in which a storage space S for storing items is formed.

The upper surface of the storage body 40 may be open, and the storage space S may be formed inside the storage body 40. The user can put items into the storage space S through the open upper surface of the storage body 40 and take out the items stored in the storage space S.

The body 30 may further comprise an inner body 42 (see FIGS. 5 to 8) and an outer cover 44 (see FIG. 4).

The storage body 40 may be mounted on the inner body 42.

The inner body 42 may be located inside the outer cover 44. The inner body 42 may support the storage body 40, and the storage body 40 may be mounted and supported on the inner body 42.

The outer cover 44 may be disposed on the outside of the storage body 40 and the inner body 42 and may protect the storage body 40 and the inner body 42. The outer cover 44 may be disposed to surround the outer circumference of the storage body 40.

A door 50 that opens and closes the storage space S may be disposed on the body 30. The door 50 can be rotatably connected to the body 30, and can rotatably open and close the storage space S, as illustrated in FIG. 5 from the upper side of the storage space S.

The robot 10*a* may comprise a door driving mechanism 60 (or door rotating mechanism) connected to the door 50 to rotate the door 50.

The door driving mechanism 60 is mounted on the inner body 42 and can rotate the door 50 to a closed position C, a partially open position O1, or a fully open position O2.

The door driving mechanism 60 may pull the door 50 behind the rotational center of the door 50 and rotate the door 50 to the partially open position O1 or the fully open position O2, as illustrated in FIG. 5.

The door driving mechanism 60 may be located inside the outer cover 44. When the outer cover 44 is disposed to surround the outer circumference of the storage body 40, a space (i.e., an accommodation space) in which the door driving mechanism 60 may be accommodated may be formed on the inner circumference of the outer cover 44 and the outer circumference of the storage body 40. The door driving mechanism 60 may be accommodated in the space formed between the outer cover 44 and the storage body 40 and may be protected by the outer cover 44 and the storage body 40.

The door driving mechanism 60 may be accommodated between the rear plate of the storage body 40 and the rear plate of the outer cover 44, and breakage or damage to the door driving mechanism 60 may be minimized in the event of a frontal collision of the robot 10*a*.

FIG. 6 is a perspective view illustrating a state where the door according to the present embodiment is closed, FIG. 7 is a perspective view illustrating a state where the door according to the present embodiment is partially open, and FIG. 8 is a perspective view illustrating a state where the door according to the present embodiment is fully open.

The robot 10*a* may comprise a driving source 70, a power transmission member 80, and a spring 90. The driving source 70, the power transmission member 80, and the spring 90 may constitute the door driving mechanism 60. Examples of the power transmission member 80 may comprise a lever 82 and a driving link 84.

The body 30 may comprise a lower connection portion 45 to which the lower portion of the spring 90 is connected. The lower connection portion 45 may be formed in the inner body 42. The lower connection portion 45 may be formed in the rear portion of the inner body 42.

The height H1 of the lower connection portion 45 may be higher than the height H2 of the driving source 70.

The body 30 may further comprise a driving source bracket 46 on which the driving source 60 is mounted. The driving source bracket 46 may be disposed outside the storage body 40. An example of the driving source bracket 60 may protrude from the inner body 40. The driving source bracket 46 may be disposed to protrude rearward from the inner body 40.

The door 50 may be connected to the body 30 with a first hinge P1. A hinge supporter (not illustrated) may be formed on the upper portion of the body 30 to rotatably support the first hinge P1. The door 50 may be rotated around the first hinge P1 to open and close the storage space S (see FIG. 4).

The door 50 may comprise one end portion 51 and the other end portion 52.

An example of one end portion 51 may be the rear end portion of the door 50. One end portion 51 may be spaced apart from the first hinge P1 by a first distance L1.

The other end portion 52 may be spaced apart from the first hinge P1 by a second distance L2. The second distance L2 may be farther than the first distance L2. An example of the other end portion 52 may be the front end portion of the door 50.

The first hinge P1 may be closer to one end portion 51 than the other end portion 52.

The door 50 may comprise a door body 54, a driving link bracket 56, and a spring bracket 58.

The door body 54 may comprise one end portion 51 and the other end portion 52.

The driving link bracket 56 may be installed on the door body 54. The driving link bracket 56 may be installed to be embedded in the door body 54. The driving link 84 may be connected to the driving link bracket 56. The door 50 may comprise a driving link connection portion 55. A driving link 84 may be rotatably connected to the driving link connection portion 55 by a second hinge P2. The driving link connection portion 55 may be formed at the rear end of the driving link bracket 56.

The spring bracket 58 may be installed on the door body 54 to be spaced apart from the driving link bracket 56. The spring bracket 58 may be installed to be embedded in the door body 54. The spring bracket 58 may be spaced apart from the driving link bracket 56 in the left and right direction X. Spring 90 may be connected to spring bracket 58. The door 50 may comprise an upper connection portion 57. The upper portion of the spring 90 may be connected to the upper connection portion 57. The upper connection portion 57 may be spaced apart from the driving link connection portion 55. The upper connection portion 57 may be formed at the rear end of the spring bracket 58.

The door driving mechanism 60 can be disposed outside the storage body 40, and the storage space S of the storage body 40 can be maximized.

The driving source 70 may be installed in the body 30 and may be seated and fastened to the driving source bracket 46 of the body 30.

The driving source 70 may be closer to one end portion 51 of the one end portion 51 and the other end portion 52 of the door 50.

An example of the driving source 70 may be a motor, and the rotation axis 72 of the motor may be disposed horizontally. The rotation axis 72 of the motor may be long in the left and right direction X.

The power transmission member 80 may transmit the rotational force of the driving source 70 to the door 70 between the driving source 70 and the door 50. The power transmission member 80 can be applied to any configuration that can rotate the door 50 when the driving source 70 is driven, but, an example comprising the lever 82 and the driving link 84 will be described below.

The lever 82 may be connected to the rotation shaft 72 of the driving source 70. The lever 82 may be rotated clockwise or counterclockwise by the driving source 82. A rotation shaft connection portion to which a rotation shaft is connected may be formed on one side of the lever 82. A hinge support portion that supports the third hinge may be formed on the other side of the lever 82. The rotation shaft connection portion and the hinge support portion may be spaced apart in the longitudinal direction of the lever 82. The length of the lever 82 may be shorter than the length of the driving link 84. The lever 82 can lift and lower the driving link 84 while being disposed outside the storage body 40.

The driving link 84 may be connected to the door 50 through a second hinge P2. The driving link 84 may be connected to the lever 82 through a third hinge P3. The driving link 84 can be lifted and lowered by the lever 82 while disposed outside the storage body 40. The driving link 84 can pull the door 50 when lowered.

As illustrated in FIG. 6, the power transmission member 80 configured as above raises the driving link 84 when the lever 82 is rotated clockwise, and the door 50 can be placed approximately horizontally on the upper side of the storage body 40 by the weight of the door 50. That is, the door 50 may be disposed long in the front and rear direction Y.

As illustrated in FIG. 7, the power transmission member 80 can partially lower the driving link 84 when the lever 82 is partially rotated counterclockwise, the door 50 can be rotated around the first hinge P1 by being guided by the driving link 84, and the door 50 may be disposed in a substantially inclined direction on the upper side of the storage body 40 by the weight of the door 50 and the external force of the driving link 84. That is, the door 50 may be disposed long in an inclined direction between the front and rear direction Y and the upper and lower direction Z.

As illustrated in FIG. 8, the power transmission member 80 can maximally lower the driving link 84 when the lever 82 is rotated maximum counterclockwise, and the door may be rotated around the first hinge P1 by being guided by the driving link 84 and may be disposed approximately vertically on the upper side of the storage body 40 by the external force of the driving link 84. That is, the door 50 may be disposed long in the upper and lower direction Z.

The spring 90 can compensate for the gravity of the door 50. One side of the spring 90 may be connected to the body, and the other side of the spring 90 may be connected to the door 50. One side of the spring 90 may be defined as the lower portion of the spring, and the other side of the spring 90 may be defined as the upper portion of the spring.

As the size of the door 50 increases, the moment of the portion of the door 50 opposite to the door driving mechanism 60 (that is, one end portion 52) increases, and the torque required for the driving source 70 increases, but the spring 90 provides an elastic force that offsets the weight of the door 50 (i.e., weight in the direction of gravity), thereby compensating for torque that interferes with the driving (rotation) of the door 50.

The length of the spring 90 may be shorter than the length of the driving link 84.

The spring 90 can compensate for the gravity of the door 50 by pulling the door 50, especially the upper connection portion 57, downward, and the driving source 70 can rotate the door 50 with a relatively small torque.

Each of the springs 90 and spring brackets 58 is provided as a pair, and the driving link 84 may be disposed between the pair of springs 90.

The pair of springs 90 can be spaced apart in the left and right direction X, and the pair of springs 90 can help the door 50 rotate more stably when the driving source 70 is driven, and when the door 50 is closed, the door 50 may be prevented from closing suddenly.

FIG. 9 is a diagram illustrating a process in which a door according to the present embodiment is rotated from a state of being closed to a state of being fully open, FIG. 10 is a conceptual diagram illustrating a driving source, a power transmission member, and a door when the door according to the present embodiment is closed, FIG. 11 is a conceptual diagram illustrating a spring and a door when the door according to the present embodiment is closed, FIG. 12 is a conceptual diagram illustrating a driving source, a power transmission member, and a door when the door according to the present embodiment is open, and FIG. 13 is a conceptual diagram illustrating a spring and a door when the door according to the present embodiment is open.

FIG. 9 (*a*) is a diagram when the door is closed, FIG. 9 (*b*), FIG. 9 (*c*) and FIG. 9 (*d*) are diagrams when the door is gradually opened, FIG. 9 (*e*) is a diagram when the door is fully opened.

When the door 50 is closed, a clockwise (CW) torque is applied to the other end portion 52 of the door 50 due to the load of the door 50, and a counterclockwise (CCW) torque is applied to one end portion 51 of the door 50 due to the elastic force of the spring 90. If no external force acts on the door 50, the clockwise (CW) torque may be greater than the counterclockwise (CCW) torque, and the door 50 may be disposed approximately horizontally while supported on the body 30.

When the driving source 70 is driven, the lever 82 may be gradually laid down as illustrated in FIG. 9 (*b*), FIG. 9 (*c*), FIG. 9 (*d*), and FIG. 9 (*e*), the driving link 84 may be gradually lowered, and the door 50 may be erected vertically to open the storage space(S), as illustrated in FIG. 9 (*e*).

One example of spring 90 may be a tension spring. As illustrated in FIG. 9 (*a*) and FIG. 11, the spring 90 may be maximally stretched when the door 50 is closed and can compensate for the load of the door 50 to the greatest extent.

As illustrated in FIG. 9 (*e*) and 13, the spring 90 can be stretched to a minimum when the door 50 is opened and can compensate for the load on the door 50 to the minimum.

Under certain conditions, the robot 10*a* as described above can open the door 50 by driving the driving source 70 in the door opening mode.

An example of the door opening mode is that a door opening command is input through the input unit 12, and when the door opening command is input, the driving source 70 may perform the door opening mode.

The user can input the password through the input unit (for example, touch screen) of the input unit 12, and if the input password matches the pre-stored password, the driving source 70 can perform the door opening mode.

Another example of the door opening mode is that the user inputs a door opening command through a mobile terminal such as a smartphone 10*d*, and when the door opening command is input, the driving source 70 may perform the door opening mode.

The user can input a door opening command through an app installed on the mobile terminal, the communication interface 11 can receive a signal from the mobile terminal, and when a door opening command signal is received through the communication interface 11, the driving source 70 can perform the door opening mode.

Another example of the door opening mode is that a door opening command is input through an electronic key held by the user, and when the door opening command is input, the driving source 70 may perform the door opening mode.

The user can approach the robot 10*a*, and the robot 10*a* can detect the user's approach through a communication interface 11 such as a sensing device such as a camera or Bluetooth, RFID, and infrared communication, and when the user approaches the robot 10*a* at a predetermined distance, the driving source 70 can perform a door opening mode. At this time, the driving source 70 can also open the door 50 in inverse proportion to the distance from the user. For example, when it is detected that the user approaches within 3 m, the driving source 70 partially opens the door 50, and when it detects that the user approaches within 1 m, the driving source 70 may open the door 50 to the maximum.

The above description is merely illustrative of the technical spirit of the present disclosure, and various modifications and changes can be made by those of ordinary skill in the art, without departing from the scope of the present disclosure.

Therefore, the embodiments disclosed in the present disclosure are not intended to limit the technical spirit of the present disclosure, but are intended to explain the technical spirit of the present disclosure. The scope of the technical spirit of the present disclosure is not limited by these embodiments.

The scope of the present disclosure should be interpreted by the appended claims, and all technical ideas within the scope equivalent thereto should be construed as falling within the scope of the present disclosure.

What is claimed is:

1. A robot comprising:

a body comprising a storage body with a storage space formed therein;

a door connected to the body with a first hinge and configured to rotate about the first hinge to open and close the storage space;

a driving source installed on the body;

a power transmission member configured to transmit a rotational force of the driving source between the driving source and the door; and a spring having a first side connected to the body and a second side connected to the door to compensate for a gravity of the door, wherein the power transmission member comprises:

a lever connected to a rotation shaft of the driving source; and a driving link connected to the door with a second hinge, connected to the lever with a third hinge, and disposed outside the storage body, wherein the door comprises:

a driving link connection portion where the driving link is rotatably connected to the second hinge, and an upper connection portion to which an upper portion of the spring is connected and spaced apart from the driving link connection portion, and wherein the body comprises a lower connection portion to which a lower portion of the spring is connected.

2. The robot of claim 1, wherein the body is disposed outside the storage body and comprises a driving source bracket on which the driving source is mounted.

3. The robot of claim 1, wherein a length of the spring is shorter than a length of the driving link.

4. The robot of claim 1, wherein a pair of springs are provided, and wherein the driving link is disposed between the pair of springs.

5. The robot of claim 1, wherein the door comprises a first end portion spaced apart from the first hinge by a first distance, and a second end portion spaced apart from the first hinge by a second distance greater than the first distance, and wherein the driving source is closer to the first end portion.

6. The robot of claim 1, wherein a height of the lower connection portion is higher than a height of the driving source.

7. The robot of claim 1, wherein the spring is tensioned to a maximum when the door is closed and is tensioned to a minimum when the door is opened.

8. A robot comprising:

a body comprising a storage body with a storage space formed therein;

a door connected to the body with a first hinge and configured to rotate about the first hinge to open and close the storage space;

a driving source installed on the body;

a power transmission member configured to transmit a rotational force of the driving source between the driving source and the door; and a spring having a first side connected to the body and a second side connected to the door to compensate for a gravity of the door, wherein the power transmission member comprises:

a lever connected to a rotation shaft of the driving source; and a driving link connected to the door with a second hinge, connected to the lever with a third hinge, and disposed outside the storage body, wherein the door comprises:

a door body;

a driving link bracket installed on the door body and to which the driving link is connected, and a spring bracket installed on the door body to be spaced apart from the driving link bracket and to which the spring is connected.

* * * * *